United States Patent
Quioc

(10) Patent No.: US 8,628,114 B1
(45) Date of Patent: Jan. 14, 2014

(54) RELEASABLE TETHER RETENTION SYSTEM

(75) Inventor: Eduardo L. Quioc, Westland, MI (US)

(73) Assignee: TK Holdings, Inc., Armada, MI (US)

(*) Notice: Subject to any disclaimer, the term of this patent is extended or adjusted under 35 U.S.C. 154(b) by 105 days.

(21) Appl. No.: 13/184,118

(22) Filed: Jul. 15, 2011

Related U.S. Application Data

(60) Provisional application No. 61/364,709, filed on Jul. 15, 2010.

(51) Int. Cl.
*B60R 21/2338* (2011.01)
*B60R 22/36* (2006.01)
*B60R 22/46* (2006.01)

(52) U.S. Cl.
USPC ........ 280/743.2; 242/374; 280/734; 280/806; 297/478; 297/480

(58) Field of Classification Search
USPC ............ 242/374, 375.2; 280/734, 743.2, 806, 280/736, 739, 742, 743.1; 297/478, 480
IPC .................................................. B60R 21/2338
See application file for complete search history.

(56) References Cited

U.S. PATENT DOCUMENTS

| | | | | |
|---|---|---|---|---|
| 6,371,517 B1 * | 4/2002 | Webber et al. | ................ | 280/736 |
| 6,390,501 B1 * | 5/2002 | Greib et al. | ................ | 280/743.2 |
| 6,422,597 B1 * | 7/2002 | Pinsenschaum et al. | ..... | 280/735 |
| 6,454,300 B1 * | 9/2002 | Dunkle et al. | ................ | 280/742 |
| 6,513,835 B2 * | 2/2003 | Thomas | ................ | 280/743.2 |
| 6,616,184 B2 * | 9/2003 | Fischer | ................ | 280/743.2 |
| 6,634,671 B2 * | 10/2003 | Heigl et al. | ................ | 280/743.2 |
| 6,648,371 B2 * | 11/2003 | Vendely et al. | ................ | 280/739 |
| 6,749,217 B2 * | 6/2004 | Damian et al. | ................ | 280/734 |
| 6,918,614 B2 * | 7/2005 | Ryan | ................ | 280/743.2 |
| 6,932,384 B2 * | 8/2005 | Waid et al. | ................ | 280/739 |
| 7,111,871 B2 * | 9/2006 | Thomas | ................ | 280/743.2 |
| 7,240,917 B2 * | 7/2007 | Fogle et al. | ................ | 280/739 |
| 7,275,763 B2 * | 10/2007 | Thomas et al. | ................ | 280/743.2 |
| 7,350,734 B2 | 4/2008 | Stevens | ................ | 242/374 |
| 7,374,205 B2 * | 5/2008 | Thomas | ................ | 280/743.2 |
| 7,490,854 B2 * | 2/2009 | Thomas | ................ | 280/739 |
| 7,506,892 B2 * | 3/2009 | Klinkenberger et al. | .. | 280/743.2 |
| 7,510,212 B2 * | 3/2009 | Green et al. | ................ | 280/743.2 |
| 7,591,482 B2 * | 9/2009 | Thomas et al. | ................ | 280/739 |
| 7,695,014 B2 * | 4/2010 | Parks et al. | ................ | 280/743.2 |
| 7,762,584 B2 * | 7/2010 | Morita et al. | ................ | 280/739 |
| 7,832,763 B2 * | 11/2010 | Stevens | ................ | 280/743.2 |
| 2008/0203716 A1 * | 8/2008 | Parks et al. | ................ | 280/743.2 |

OTHER PUBLICATIONS

U.S. Appl. No. 13/153,225, filed Jun. 3, 2011.
U.S. Appl. No. 13/153,339, filed Jun. 3, 2011.

* cited by examiner

*Primary Examiner* — Joseph Rocca
*Assistant Examiner* — Laura Freedman
(74) *Attorney, Agent, or Firm* — L.C. Begin & Associates, PLLC.

(57) ABSTRACT

A releasable tether retention system includes a housing having a slot extending therealong and a projection extending into the slot. The projection is coupled to the housing so as to be movable along the housing between a first position along the slot and a second position along the slot. Rotation of the projection is prevented when the projection is in the first position, and rotation of the projection is enabled when the projection is in the second position.

19 Claims, 6 Drawing Sheets

RELEASABLE TETHER RETENTION SYSTEM

CROSS-REFERENCE TO RELATED APPLICATIONS

This application claims the benefit of U.S. Provisional Application Ser. No. 61/364,709, filed on Jul. 15, 2010, which is incorporated by reference herein in its entirety.

BACKGROUND OF THE INVENTION

Airbags and other pliable and inflatable restraints are being designed using releasable tethers to selectively modify the shape of the restraint, to provide the restraint with enhanced rigidity, and to control venting of the restraint during deployment. For example, in certain designs of airbag vent valve actuation mechanisms, the tether retention system maintains tension in the tether prior to release of the tether, and tension in the tether maintains a valve controlling an airbag vent in a closed condition. At some point during or after deployment of the inflatable device, tension in the tether may be relieved to permit actuation of the vent valve and subsequent release of airbag gases.

There is an ongoing need to minimize the costs involved in fabricating and installing tether retention systems. There is also an ongoing need to minimize the response times and maximize the reliability of such systems.

SUMMARY OF THE INVENTION

In one aspect of the embodiments of the present invention, a releasable tether retention system is provided including a housing having a slot extending therealong and a projection extending into the slot. The projection is coupled to the housing so as to be movable along the housing between a first position along the slot and a second position along the slot. Rotation of the projection is prevented when the projection is in the first position, and wherein rotation of the projection is enabled when the projection is in the second position.

In another aspect of the embodiments of the present invention, a releasable tether retention system is provided including a housing and a projection coupled to the housing so as to be movable along the housing between a first position and a second position. A tether is retained on the projection when the projection is in the first position, and the tether is detachable from the projection responsive to a force exerted on the projection by the tether when the projection is in the second position.

In another aspect of the embodiments of the present invention, a releasable tether retention system is provided including a housing and a projection extending from the housing. The projection is coupled to the housing so as to be movable along the housing. The projection is also rotatable between a first orientation at a first position along the housing, and a second orientation at second position along the housing different from the first position.

DETAILED DESCRIPTION

Figure 1:
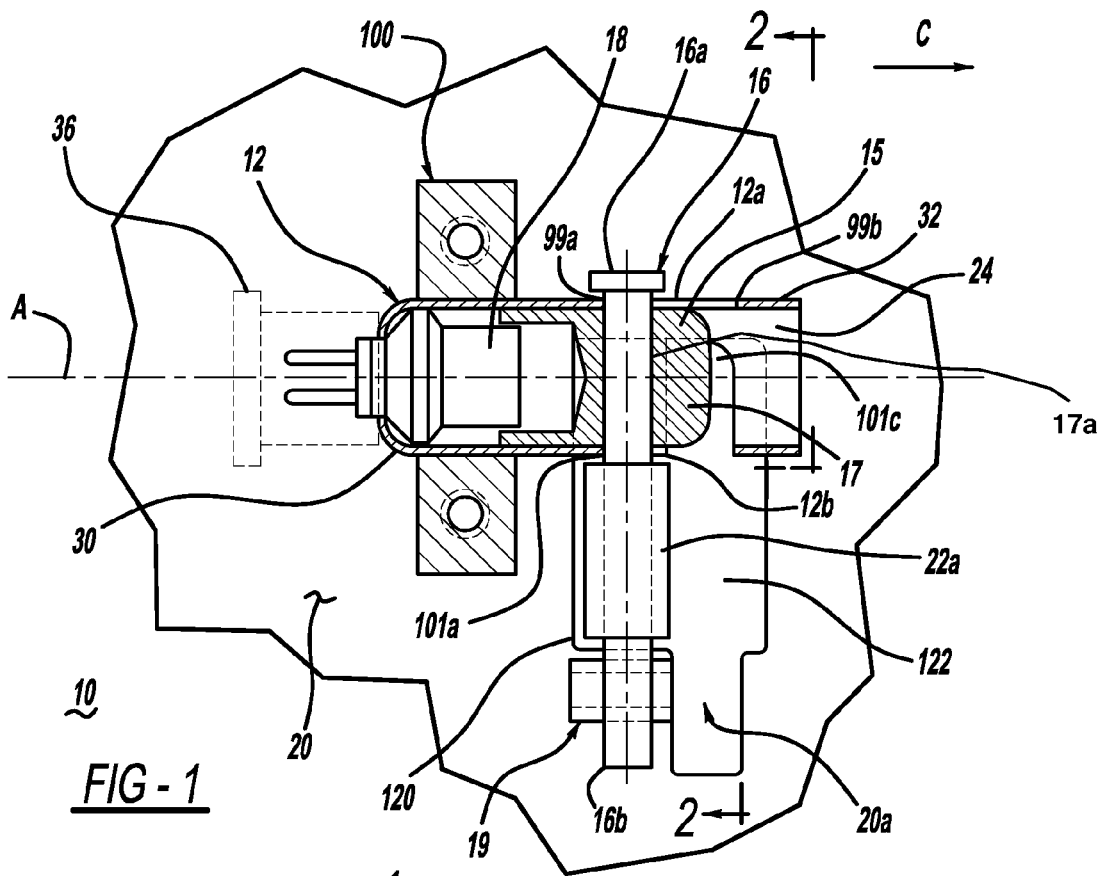
FIG. 1 is a plan view of a releasable tether retention system and associated components thereof in accordance with one embodiment of the present invention, prior to actuation of the system to release a tether retained thereon.

Referring to FIGS. 1-11, a releasable tether retention system 10 in accordance with one embodiment of the present invention includes a housing 12, a tether retention member 15 slidably or otherwise movably mounted to housing 12 for retaining a tether 22 prior to activation of the tether retention to release the tether, and an actuator 18 operatively coupled to housing 12 for producing a motion of tether retention member 15 after receipt of an actuation signal. A retention member support 19 is configured and mounted in a position where it can support a portion of the retention member 15 until release of the tether is desired.

Figure 5:
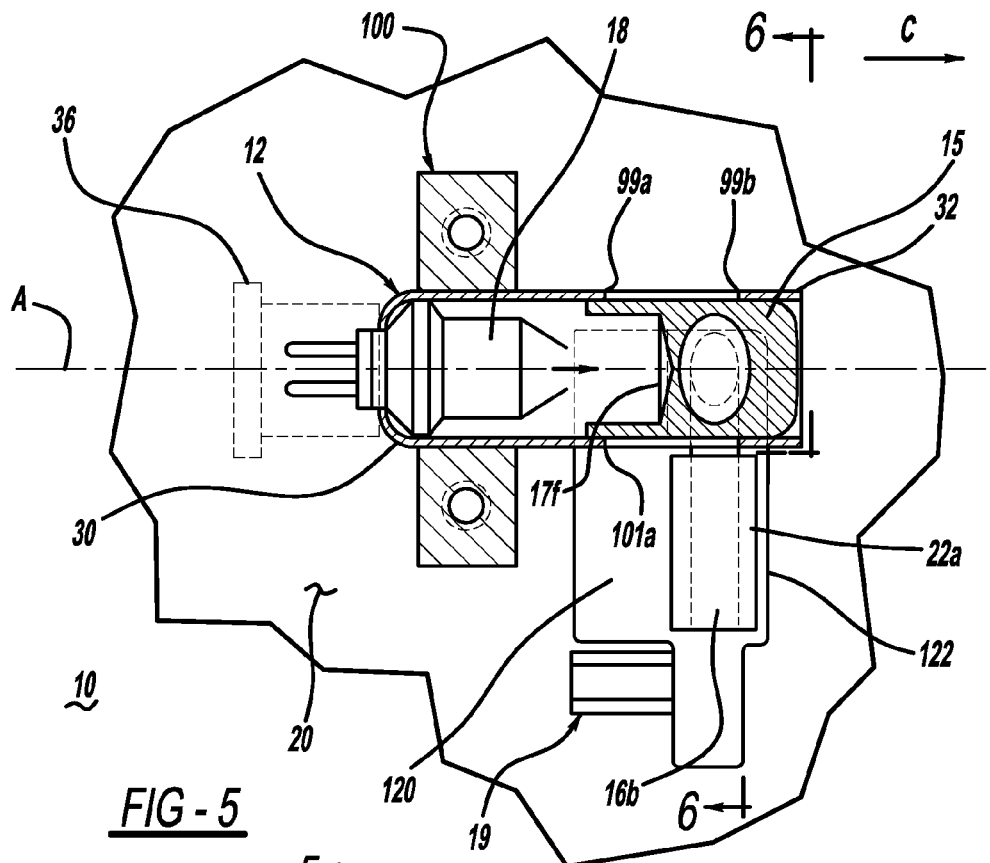
FIG. 5 is a plan view of the releasable tether retention system of FIG. 1 after actual release of the tether.
Figure 6:
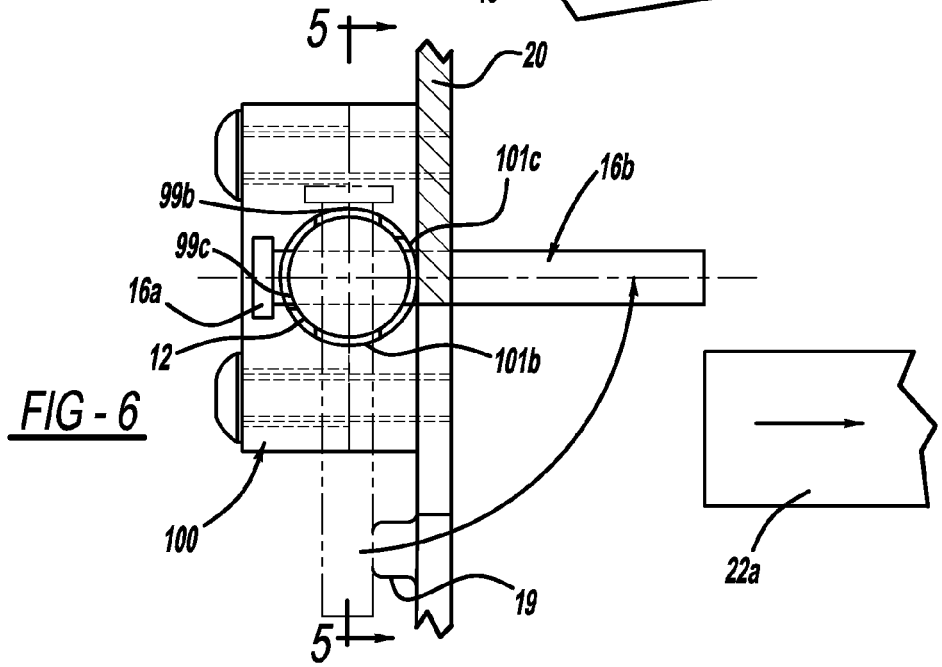
FIG. 6 is an end view of the tether retention system in the configuration shown in FIG. 5, showing the tether falling away from the retention system after the tether has detached from the tether retention member.
Figure 7:
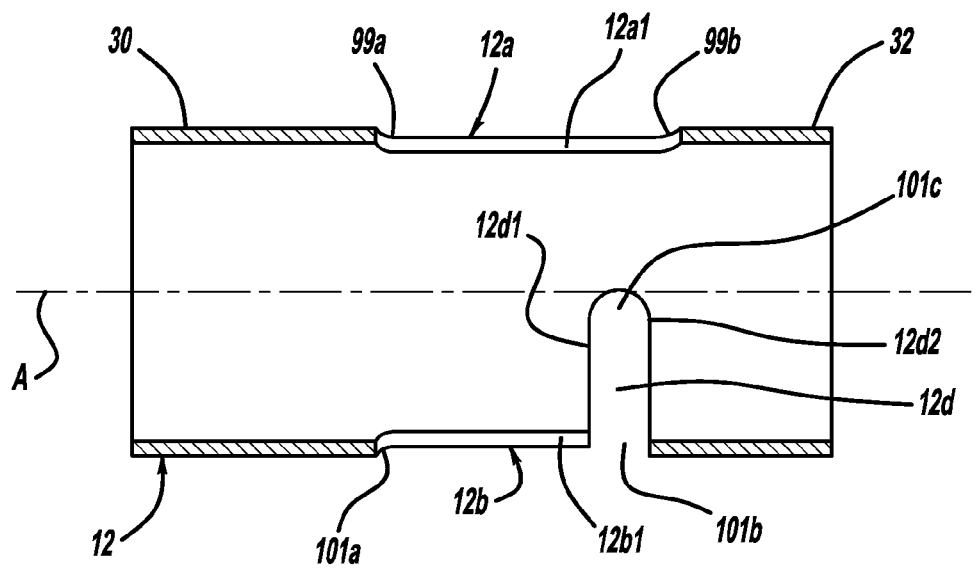
FIG. 7 is a cross-sectional view of a portion of a tether retention system housing in accordance with one embodiment of the present invention.
Figure 8:
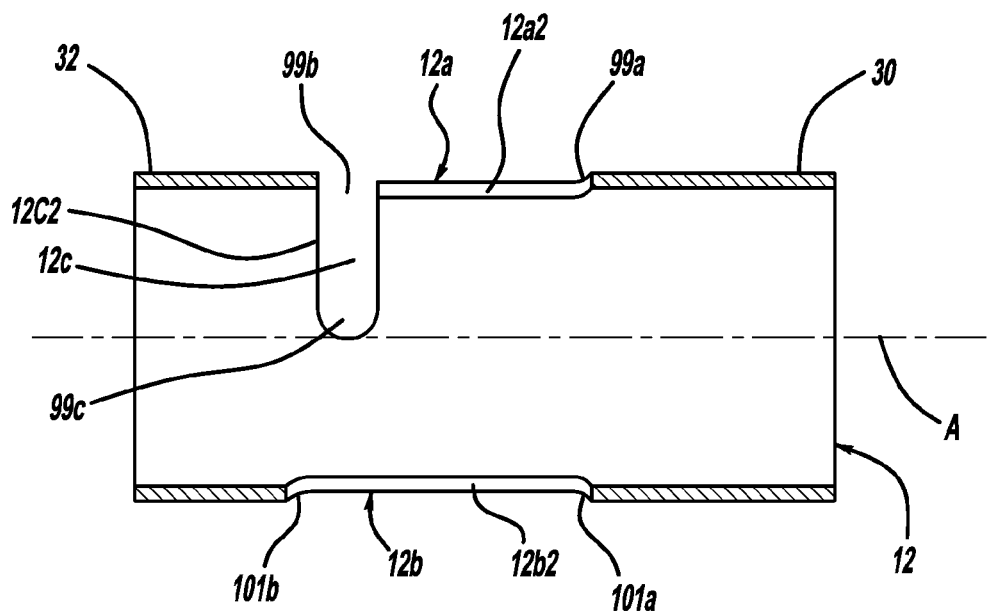
FIG. 8 is another cross-sectional view of a portion of the housing shown in FIG. 7.
Figure 9:
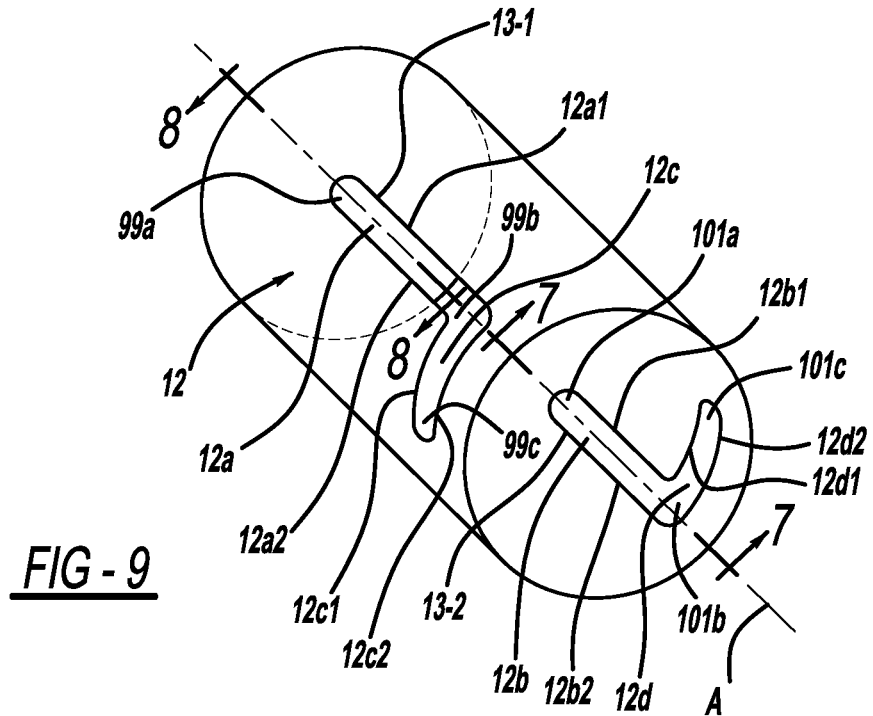
FIG. 9 is a perspective view of the housing shown in FIGS. 7 and 8.

In the embodiment shown in FIGS. 1-11, and referring to FIGS. 7-9 in particular, housing 12 has a pair of opposed slots 13-1 and 13-2 extending along and through walls of the housing. Slot portions 12a and 12c of slot 13-1 extend along a first side of the housing and intersect at a slot portion end 99b. Slot portions 12b and 12d of slot 13-2 extend along a second side of the housing opposite the first side and intersect at a slot portion end 101b.

In the embodiment shown in FIGS. 1-11, housing 12 has a first end 30 with a first opening and a second end 32 opposite first end 30. The second end 32 includes a second opening. In the embodiment shown, the first and second housing openings are coaxial along an axis A of the housing. An axial bore 24 extends through housing 12 between first end 30 and second end 32. In a particular embodiment, first end 30 of the housing 12 is configured so as to be crimpable or otherwise deformable to aid in retaining actuator 18 within (or to) housing 12. If desired, housing 12 may include features such a shoulder (not shown) configured to limit the travel of movable member 15 (described below) within bore 24 during operation of the tether retention system. Housing 12 may be formed using any suitable method from a metallic material or any other suitable material.

Retention member 15 includes a movable portion 17, a first projection 16a extending from movable portion 17, and a second projection 16b extending from movable portion 17. In the particular embodiment shown in FIGS. 1-11, first and second projections 16a and 16b are incorporated into a single tether retaining member 16 formed separately from movable portion 17. Tether retaining member 16 is then coupled to movable portion 17 so as to move along housing bore 24 in conjunction with the movable portion.

In the embodiment shown in FIGS. 1-11, movable portion 17 includes a shaft 17a sized for receiving therein a tether retaining member 16 in the form of a pin incorporating the first and second projections 16a and 16b. Pin 16 has a head and a shank 23 extending from the head. In this embodiment, first projection 16a is formed by a portion of shank 23 projecting through housing slot portions 12a and 12c, and second projection 16b is formed by a portion of shank 23 projecting through slot portions 12b and 12d. In other embodiments, the tether retaining member may have any of a variety of other configurations. For example, the first and second projections and the movable portion may be formed as a single piece including the features described herein. Both movable portion 17 and tether retaining member 16 may be formed from metallic materials or any other suitable materials. In an embodiment where the tether retention member 15 is formed as a single piece, the retention member may be formed from a metallic material(s) or any other suitable material(s).

Movable portion 17 is configured to slidably move along and within bore 24 responsive to a motive force resulting from activation of actuator 18. Movable portion 17 is positioned either in fluid communication with actuator 18 (described below) or so as to enable fluid communication with the actuator after activation of the tether retention system. Activation of movable portion 17 in the manner described below produces motion of the movable portion and the tether retaining member 16 within bore 24.

In the particular embodiment shown in FIGS. 1-11, a portion of actuator 18 (described below) extends into and is secured within housing first end 30, and a portion of the actuator extends outside of the housing first end. A portion of housing first end 30 is then secured within a bore seal 36 so as to enclose the portion of the actuator extending from housing end 30. If desired, bore seal 36 may provide an interface permitting mating of a connector or other suitable signal transmission medium (not shown) with the actuator 18.

Referring to FIGS. 7-9, a pair of straight first slot portions 12a and 12b are formed in opposed wall portions of housing 12. In the embodiment shown in FIGS. 7-9, each of first slot portions 12a and 12b extends along a respective axis that is substantially parallel to housing axis A. In addition, a second slot portion 12c intersects and extends from an end 99b of first slot portion 12a. Also, a second slot portion 12d intersects and extends from an end 101b of first slot portion 12b. Each of second slot portions 12c and 12d extends along a respective axis that lies in a plane that is substantially perpendicular to housing axis A.

Also, referring to the drawings, first slot portions 12a and 12b are configured so that edges 12a1 and 12a2 of slot portion 12a are aligned with and opposite corresponding opposed edges 12b1 and 12b2 of slot portion 12b. In addition, second slot portions 12c and 12d are configured so that edges 12c1 and 12c2 of slot portion 12c are coplanar with and opposite corresponding opposed edges 12d1 and 12d2 of slot portion 12d, along planes passing through the slot portion edges and perpendicular to the housing axis A. That is, the slot edges 12a1 and 12b1 are coplanar along a plane extending parallel to a plane extending through housing central axis A and passing through centerlines of the slot portions 12a and 12b. Also, the slot edges 12a2 and 12b2 are coplanar along a plane extending parallel to a plane extending through housing central axis A and passing through centerlines of the slot portions 12a and 12b. Similarly, the slot edges 12c1 and 12d1 are coplanar along a plane extending perpendicular to axis A, and the slot edges 12c2 and 12d2 are coplanar along a plane extending perpendicular to axis A. This structure accommodates movement of first and second projections 16a and 16b which are coaxial and which extend from the movable portion 17 in opposite directions. In alternative embodiments, the first and second projections do not extend from the movable portion in opposite directions, but rather extend from the movable portion 17 at an angle of less than 180 degrees with respect to each other. In still other embodiments, the first and second projections are not coaxial. In still other embodiments, the first and second projections are not coaxial and also extend from the movable portion 17 at an angle of less than 180 degrees with respect to each other.

For the purposes described herein, in the embodiments shown in FIGS. 1-9, a plane along which first slot portions 12a and 12b extend is understood to be a plane passing through axis A and also through the centerlines of the first slot portions. Also, a plane along which second slot portions 12c and 12d extend is understood to be a plane which is perpendicular to axis A and which passes through the centerlines of the second slot portions.

Slot portions 12a and 12c are sized to receive therein a portion of tether retention member first projection 16a and to enable the first projection 16a to slide easily along the slot portions (i.e., with minimal resistance from the edges of the slots). Slot portions 12b and 12d are sized to receive therein portions of tether retention member second projection 16b, and to enable the second projection 16b to slide easily along the slot portions (i.e., with minimal resistance from the edges of the slots).

In addition, second slot portion 12c extends a predetermined arc length along a wall of housing 12 to enable a rotation of retaining member first projection 16a within second slot portion 12c, from first slot portion end 99b toward second slot portion end 99c, after the motion of the retention member along bore 24 has forced retention member 15 from first slot portion first end 99a to first slot portion second end 99b.

Similarly, second slot portion 12d extends a predetermined arc length along a wall of housing 12 to enable a rotation of retaining member second projection 16b within second slot portion 12d, from first slot portion end 101b toward second slot portion end 101c, after the motion of the retention member 15 has forced the retention member from first slot portion first end 101a to first slot portion second end 101b, as described below.

In a particular embodiment, the predetermined arc length along which second slot portion 12c extends is specified such that retention member first projection 16a is permitted to rotate 90 degrees from first slot portion end 99b to second slot portion end 99c after the first projection 16a reaches end 99b of first slot portion 12a. In addition, the predetermined arc length along which second slot portion 12d extends is specified such that retention member second projection 16b is permitted to rotate 90 degrees from first slot portion end 101b to second slot portion end 101c after the second projection 16b reaches end 101b of first slot portion 12b. However, the arc lengths along which the second slot portions extend may alternatively be configured so as to enable rotation of the respective retention member projections either less than 90 degrees or more than 90 degrees, depending on the requirements of a particular application.

In a particular embodiment, a stop mechanism (not shown) is incorporated into the tether retention system to halt travel of the movable portion 17 within housing 12 at a specified location within the housing. The stop mechanism may include one or more elements located on the movable portion 17 and-configured to engage a portion of the housing (or another feature of the tether retention system) to stop the movable portion 17 when the movable portion has reached a desired location. In a particular embodiment, the desired stop location of the movable portion 17 is a location enabling rotation of portions of the retention member projections 16a and 16b into second slot portions 12c and 12d without the projections being rotationally impeded by side edges of the slot portions 12c and 12d during rotation, thereby facilitating smoother rotation of the retention member 15 and operation of the tether retention system as described below.

Housing 12 may be mounted to any suitable surface, for example, to a portion of a vehicle or device to which the tether retention system is operatively coupled. In a particular embodiment, the housing is mounted to a base 20 (described below) to which retaining member support 19 (described below) may also be mounted. In another embodiment, the mounting surface for housing 12 is formed separately from the vehicle or device and is attached by welding or any other suitable method to a portion of the vehicle or device. Retaining member support 19 may also be mounted on a surface different from the surface on which housing 12 is mounted. Housing 12 is mounted to its mounting surface so as to remain fixed or stationary with respect to base 20. Housing 12 may be mounted to its mounting surface using welding, a clamp 100 (as shown in FIGS. 1-11), or any other suitable means. Housing 12 may be formed using any suitable method from a metallic material or any other suitable material.

In one embodiment, a detent feature (not shown) is provided for preventing movement of the movable portion 17 within bore 24 prior to activation of the tether retention system. In one particular embodiment, the detent feature is in the form of a knurl, stake, or other deformation (not shown) in a surface of the movable portion 17 which engages a wall of the housing defining the bore 24. In another particular embodiment, the detent feature is formed in the housing 12, rather than in the movable portion 17.

Actuator 18 is secured in housing first end 30 and extends into bore 24 so as to enable fluid communication between the actuator and bore 24 containing movable portion 17, after activation of the tether retention system. In one embodiment, actuator 18 is in the form of an electrically-actuated pyrotechnic initiator, or squib, a portion of which is secured within bore seal 36 or housing 12. Actuator 18 may be formed as known in the art. One exemplary actuator construction is described in U.S. Pat. No. 6,009,809, herein incorporated by reference. Bore seal 36 may be stamped, extruded, cast, machined, or otherwise metal formed and may be made from carbon steel or stainless steel, for example.

Actuator 18 may be secured within bore seal 36 using any of a variety of known methods including, but not limited to, an interference fit, adhesive application, or crimping. Similarly, bore seal 36 may be secured to housing 12 using any of a variety of known methods including, but not limited to, crimping, welding, or adhesive application. In addition, features may be provided for engaging the actuator and/or bore seal with base 20 or a portion of the vehicle or device to which system 10 is mounted, to aid in preventing rotation or other movement of the actuator relative to housing 12 and/or base 20.

In alternative embodiments, actuator 18 may be in the form of a pneumatically or hydraulically actuated valve or valve portion coupled to an end of housing 12 so as to enable fluid communication between an outlet of the valve and bore 24 upon receipt by the retention system of a suitable activation signal. In these embodiments, activation of the system to actuate the tether results in opening of the valve to admit a high-pressure fluid into bore 24, resulting in movement of the retention member 15 as described below. Alternatively, actuator 18 may be positioned remotely from housing 12 but so as to enable fluid communication between the actuator and bore 24 upon receipt of a suitable activation signal by the tether retention system.

A tether retaining member support 19 is provided for supporting an end of second projection 16b as shown in FIGS. 1-11, prior to activation of the tether retention system. In the embodiment shown in FIGS. 1-11, support 19 is mounted to base 20 and is positioned in relation to housing 12 so as to support an end of second projection 16b prior to activation of the tether retention system.

Base 20 may be any suitable mounting surface, for example, to a portion of a vehicle or device to which the tether retention system is operatively coupled. In a particular embodiment, the base 20 is the same surface to which housing 12 is mounted. In another embodiment, base 20 is formed separately from the vehicle or other device and is attached by welding or any other suitable method to a portion of the vehicle or device to which the tether retention system is to be secured.

Base 20 has an opening 20a formed therein through which an end portion 22a of the tether 22 extends. Opening 20a has a first portion 120 over which tether second projection 16b is suspended prior to activation of the tether retention system. Opening portion 120 is sized to prevent passage of second projection 16b of retention member 15 into the opening portion due to rotation of retaining member 16.

As seen in FIGS. 1-11, housing 12 is positioned on and secured to base 20 such that tether end portion 22a extends through opening first portion 120 and is looped around second projection 16b prior to activation of the tether retention system. In addition, support 19 is mounted adjacent opening portion 120 as shown to support the end of second projection 16b prior to activation of the tether retention system.

Opening 20a also has a second opening portion 122 adjacent the first portion 120. Opening portion 122 is sized to permit rotation of second projection 16b of retention member 15 into the second opening portion after activation of the tether retention system, in a manner described in greater detail below.

Base 20 may be formed using any suitable method from a metallic material or any other suitable material.

Figure 2:
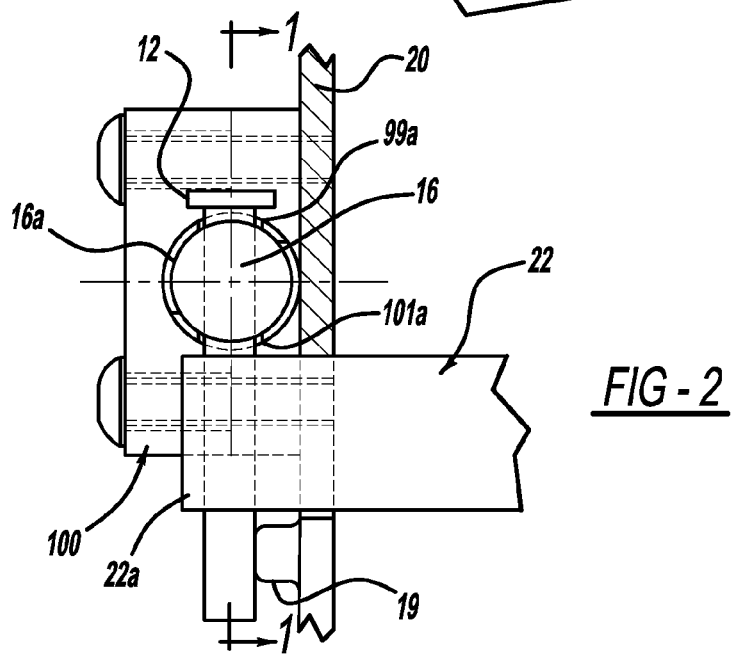
FIG. 2 is an end view of the tether retention system shown in FIG. 1.

FIGS. 1 and 2 show the retention member 15 and its associated second projection 16b in a first orientation and in a first position along slot portion 12b, prior to system activation and with tether end 22a retained thereon. As shown in FIGS. 1, 2 and 11, prior to activation of the system to release tether 22, a looped end 22a of the tether is wrapped over retaining member second projection 16b. Also, prior to system activation, retention member first projection 16a extends outside of bore 24 at end 99a of first slot portion 12a, and retention member second projection 16b extends outside of bore 24 at end 101a of first slot portion 12b.

Referring to FIGS. 1 and 2, prior to system activation, it is also seen that an end of second projection 16b rests on support 19, and that the second projection is suspended over opening portion 120. Opening portion 120 is sized in relation to the shank so that the shank is too long to rotate into the opening portion. Also, it can be seen that while first projection 16a resides in first slot portion 12a between end 99a and end 99b, rotation of retention member 15 within bore 24 is prevented by edges 12a1 and 12a2 of slot portion 12a. In addition, while second projection 16b resides in first slot portion 12b between end 101a and end 101b, rotation of retention member 15 within bore 24 is prevented by edges 12b1 and 12b2 of slot portion 12b. As rotation of the retention member is prevented, the tether end 22a remains wrapped around second projection 16b.

Figure 3:
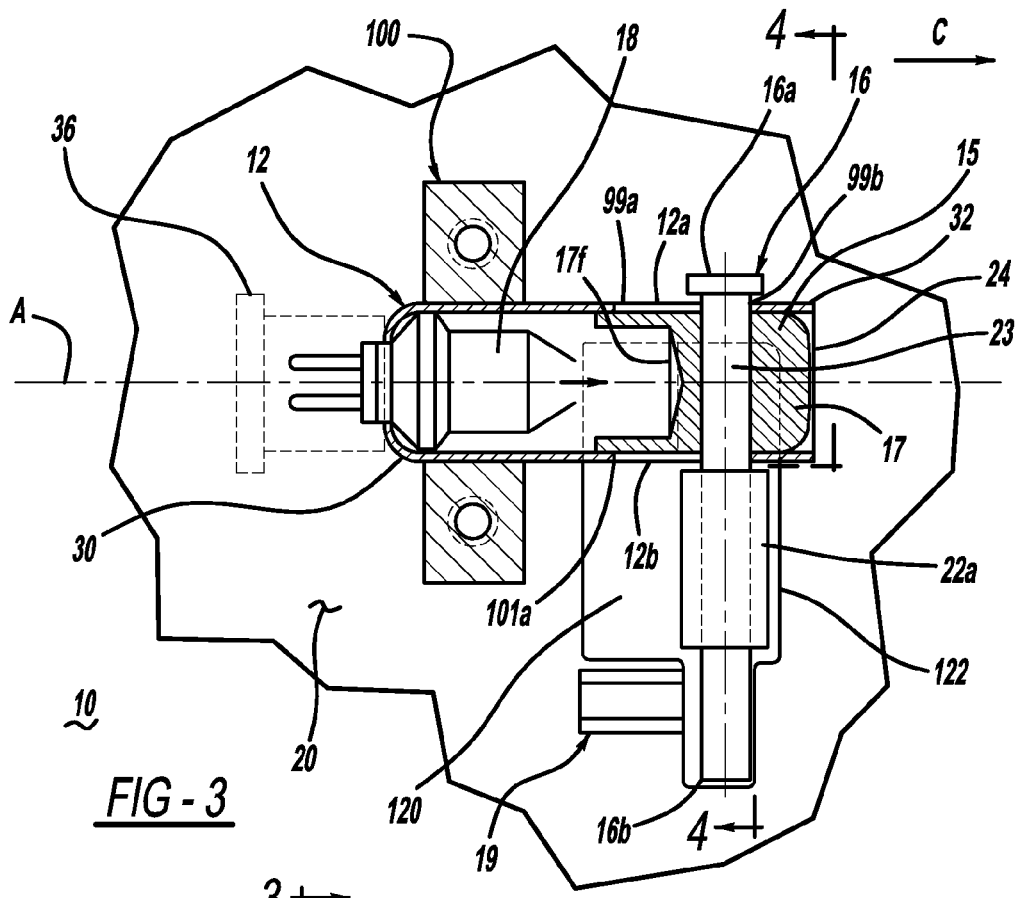
FIG. 3 is a plan view of the releasable tether retention system of FIG. 1 after actuation of the system and prior to detachment of the tether from the tether retention member.
Figure 4:
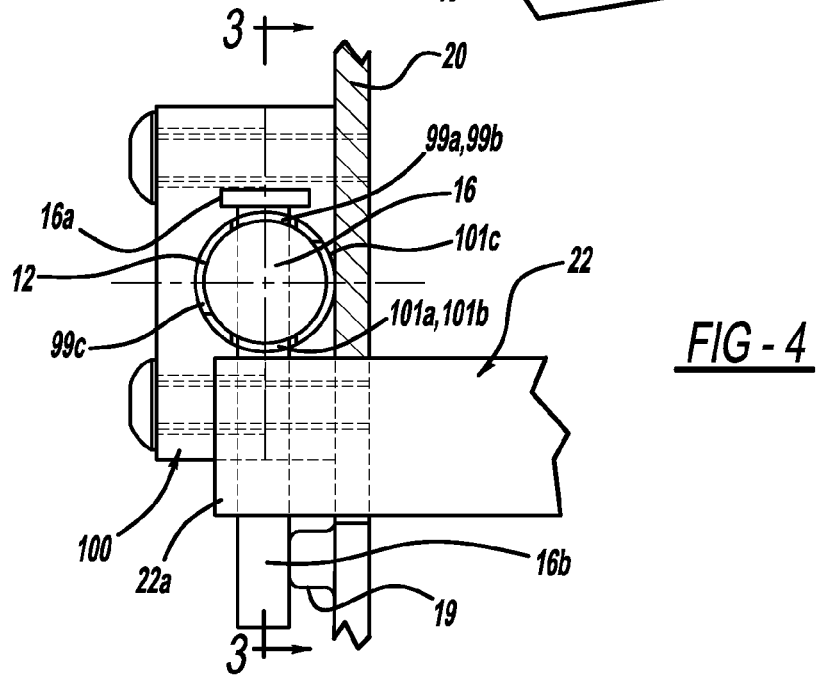
FIG. 4 is an end view of the tether retention system in the configuration shown in FIG. 3.

Referring to FIGS. 3 and 4, upon receipt of a signal from a crash sensor or other system activation mechanism, an activation signal is sent to actuator 18. In an embodiment where the actuator is a squib, combustion products from the squib impinge on an end face 17f of movable portion 17 in fluid communication with the actuator, forcing the movable portion in the direction indicated by arrow "C" in FIG. 3. Movement of the movable portion 17 in direction "C" causes a corresponding movement of first and second projections 16a and 16b in direction "C", while tether end 22a wrapped over second projection 16b also moves in direction "C".

Motion of movable portion 17 and first and second projections 16a and 16b along bore 24 in direction "C" continues until the first and second projections abut edges of first slot portion ends 99b and 101b. FIG. 3 shows projection 16b at a second position along slot portion 12b. At this point, rotation of the first and second projections 16a and 16b within housing 12 is no longer constrained by edge 12a1 of first slot portion 12a and by edge 12b2 of first slot portion 12b. Thus, forces exerted on the retention member 15 by tether 22 via second projection 16b urge rotation of the retention member so that first projection 16a moves along second slot portion 12c from first slot portion end 99b toward second slot portion end 99c. Similarly, second projection 16b rotates along second slot portion 12d from first slot portion end 101b toward second slot portion end 101c.

Stated another way, as retention member 15 continues to move in direction "C", the second projection 16b slides off of support 19 and over opening portion 122 of base 20. During this process, the first and second projections 16a and 16b slide along housing slot portions 12a and 12b until the first and second projections 16a and 16b reach ends of the slot portions or further motion of the retaining member in direction C is impeded by a hard stop or other motion control mechanism. When first and second projections 16a and 16b reach ends of slot portions 12a and 12b, the first and second projections 16a and 16b (and the attached movable portion 17) are positioned to rotate within housing 12 along slot portions 12c and 12d responsive to forces exerted by attached tether end 22a.

Also, referring to FIGS. 5 and 6, as opening portion 122 is sized to permit rotation of the second projection 16b therein, and as the second projection end is no longer supported by support 19, the second projection 16b and the attached movable portion 17 are free to rotate until the second projection enters opening portion 122. In this manner, as the first and second projections 16a and 16b rotate into slot portions 12c and 12d, the second projection 16b also rotates into opening portion 122 wherein the tether end 22a slides off the second projection 16b as second projection 16b rotates to a second orientation shown in FIG. 6. The tether end 22a is now permitted to move responsive to forces exerted thereon.

In the embodiments of the tether retention system disclosed herein, the tether is considered to be retained on a tether retention member or by the retention system when the tether is wrapped around or otherwise secured to the retention member such detachment or separation of the secured portion of the tether from the retention system is prevented.

In one particular embodiment, the tether 22 is operatively coupled to a valve (not shown) controlling a flow of inflation gases from a vent of an airbag (also not shown). The mechanism is structured so that the valve remains closed while the tether end 22a is engaged with second projection 16b as shown in FIGS. 1 and 2. Activation of the any of the tether retention system embodiments described herein to release the tether produces movement of the second projection 16b and release of tether end 22a as just described. In an embodiment where the tether controls actuation of an airbag vent valve, after the tether end 22a slides off of second projection 16b, tension in the tether starts to relax, permitting the valve to open and allowing release of inflation gases from the airbag.

In an embodiment where the tether controls actuation of an airbag vent valve, the mechanism disclosed herein may be activated to permit release of gases from the airbag in situations where a smaller or lighter vehicle occupant is present during a crash situation. Release of a portion of the gases from the inflated airbag provides a relatively softer, less rigid cushion for the lighter vehicle occupant.

Figure 9A:
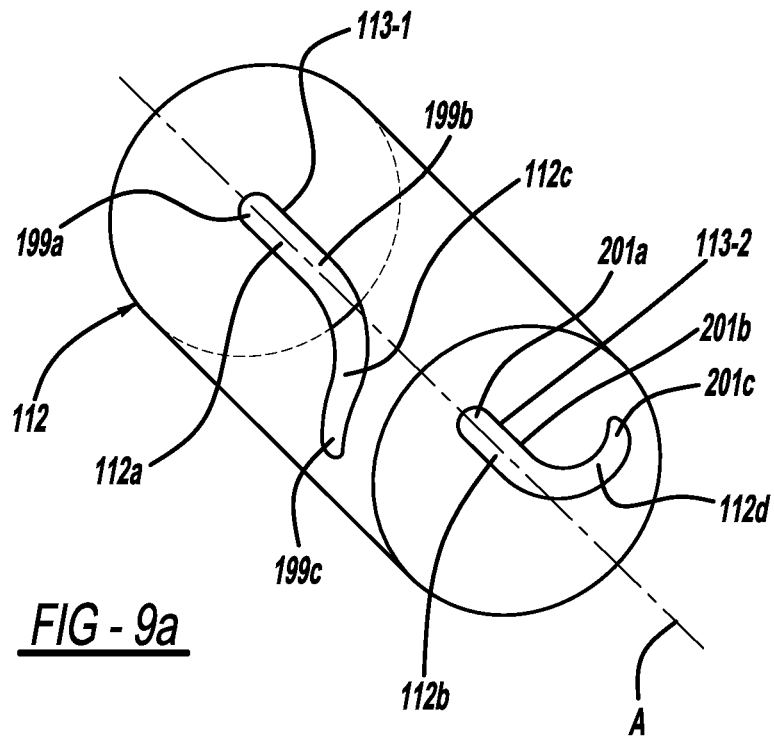
FIG. 9a is a perspective view of a housing in accordance with an alternative embodiment of the present invention.

FIG. 9a shows another embodiment 112 of the housing. In FIG. 9a, elements of the housing similar to those shown in the housing embodiment of FIG. 9 have similar reference numerals. Housing 112 has opposed straight first slot portions 112a and 112b, as seen in the previously described embodiment. First slot portion 112a has a first end 199a and a second end 199b, and first slot portion 112b has a first end 201a and a second end 201b. First ends 199a and 201a may be located in the same positions as first ends 99a and 101a of first slot portions 12a and 12b previously described herein. In addition, a second slot portion 112c intersects first slot portion 112a at slot portion end 199b. Slot portion 112c is curved along the wall of the housing 112 and terminates in a second slot portion second end 199c, which may be in the same position as second slot portion end 99c previously described. Also, a second slot portion 112d intersects first slot portion 112b at slot portion end 201b.

Slot portion 112d is also curved along the wall of the housing 112, proceeding around the housing wall from end 201b toward end 201c in the same general direction that slot portion 112c proceeds around the housing wall from end 199b toward end 199c. Thus, when the housing 112 is viewed from the side with slot portions 112a and 112b in alignment with each other, slot portions 112c and 112d appear to diverge from ends 199b and 201b of slot portions 112a and 112b, respectively. Slot portion 112d terminates in a second slot portion second end 199c, which may be in the same position as second slot portion end 99c previously described.

A tether retention system incorporating the housing of FIG. 9a operates in substantially the same way as a system using the housing embodiment shown in FIG. 9. In operation, after first projection 16a reaches first slot end 199b, first projection 16a enters curved second slot portion 112c and travels along this curved slot portion to end 199c. At the same time, after second projection 16b reaches first slot end 201b, second projection 16b enters curved second slot portion 112d and travels along this curved slot portion to end 201c. as the first and second projections travel along the curved second slot portions 112c and 112d, the first and second projections and the associated retention member 15 rotate within housing 112 to a configuration which permits the tether end 22a to be pulled off the tether responsive to a force exerted by the tether, as previously described. However, in this embodiment, rotation of the projections occurs simultaneously with a portion of the translation of the retention member within the housing bore.

Figure 10:
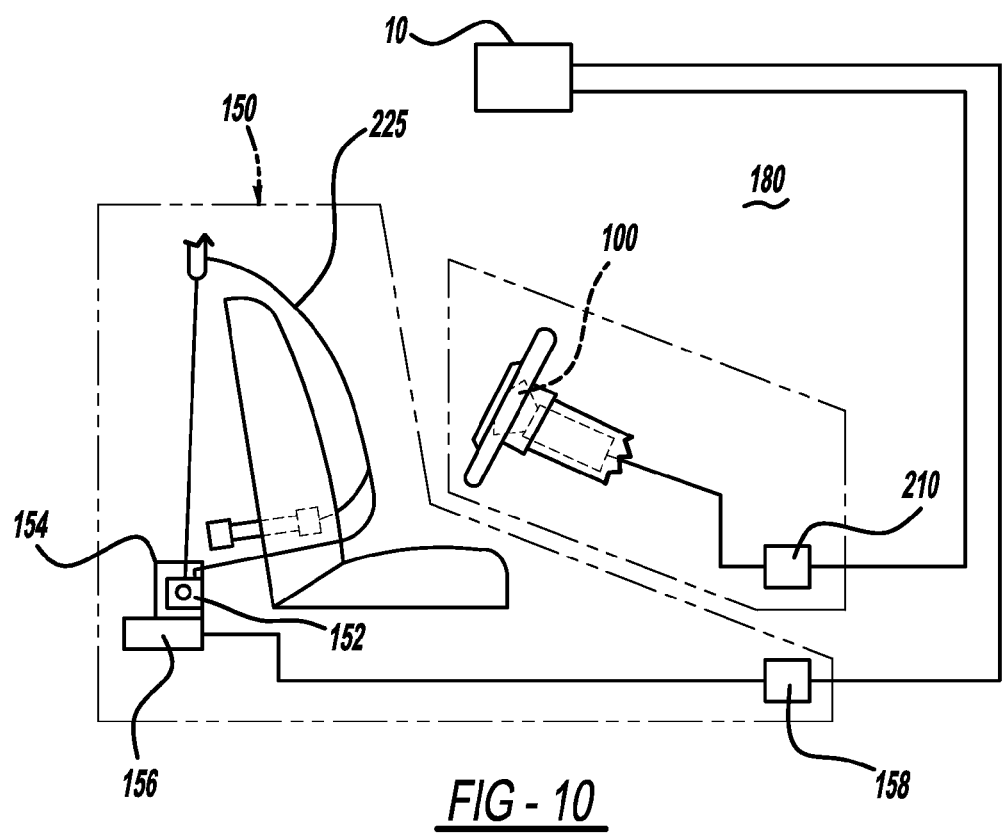
FIG. 10 is a schematic representation of an exemplary vehicle occupant protection system incorporating a releasable tether retention system in accordance with an embodiment of the present invention.

FIG. 10 shows a particular application of a tether retention system 10 in accordance with an embodiment of the present invention. Referring to FIG. 10, the tether retention system may be incorporated into a vehicle occupant protection system 180 including additional elements such as, for example, a safety belt assembly 150 and/or an airbag module 100. FIG. 10 shows a schematic diagram of one exemplary embodiment of such a protection system. tether retention system 10 may be in operable communication with a crash event sensor 210 which is in communication with a known crash sensor algorithm that signals actuation of the tether retention system via activation of actuator 18 based on any desired criteria, for example, the occurrence of a collision event, deployment of a vehicle airbag, the occurrence of a predetermined occupant condition, or any other desired criteria.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners in system 150 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

If desired, one or more of sensors 210 and/or 158 may be operatively coupled to tether retention system actuator 18 to provide one or more associated inputs prompting activation of the tether retention system, depending on such factors as vehicle occupant weight, elapsed time since the occurrence of a collision event, or any other pertinent factors, in a manner known in the art.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A releasable tether retention system comprising:
   a housing having a slot extending therealong;
   a projection extending into the slot and coupled to the housing so as to be movable along the housing between a first position along the slot and a second position along the slot,
   wherein rotation of the projection is prevented when the projection is in the first position, and wherein rotation of the projection is enabled when the projection is in the second position,
   and wherein the slot includes a first slot portion and a second slot portion intersecting the first slot portion.

2. The system of claim 1 further comprising a support coupled to the housing and positioned to support a portion of the projection prior to activation of the tether retention system.

3. The system of claim 1 wherein the housing has another slot extending therealong and another projection extending into the another slot and coupled to the housing so as to be movable along the housing between a first position along the another slot and a second position along the another slot.

4. The system of claim 3 wherein the projection extends in a first direction, and wherein the another projection extends in a second direction different from the first direction.

5. The system of claim 4 wherein the second direction is opposite the first direction.

6. The system of claim 1 wherein a plane along which the first slot portion extends is orthogonal to a plane along which the second slot portion extends.

7. The system of claim 1 wherein the first position is at an end of the first slot portion and the second position is at another end of the first slot portion.

8. The system of claim 1 wherein the first slot portion has a first end and a second end, the second slot portion has a first end and a second end, and wherein the first slot portion second end intersects the second slot portion first end.

9. The system of claim 1 wherein the second slot portion forms a curve along a wall of the housing.

10. The system of claim 1 further comprising a retention member movable along a bore of the housing, and wherein the projection extends from the retention member.

11. The system of claim 10 further comprising a pin extending through a shaft formed in the retention member, the pin including a head portion and a shank portion, and wherein the projection is formed by the shank portion of the pin.

12. A vehicle occupant protection system comprising a releasable tether retention system in accordance with claim 1.

13. A releasable tether retention system comprising:
    a housing having a slot formed therealong; and
    a retaining member rotatably positioned in the housing and including a projection extending into the slot,
    the system being structured such that the projection moves along the slot from a first position to a second position different from the first position during a rotation of the retaining member.

14. The system of claim 13 wherein the slot has a first slot portion formed therein and wherein the projection extends through the first slot portion to an exterior of the housing.

15. The system of claim 14 wherein the housing has another slot including another first slot portion formed therein and another projection extending into the another first slot portion, the another projection being coupled to the housing so as to be movable along the housing between a first position and a second position.

16. The system of claim 14 wherein the slot has a second slot portion formed therein, the second slot portion intersecting the first slot portion.

17. The system of claim 13 wherein the projection is movable along the slot from the second position to a third position during a rotation of the projection about an axis of the housing.

18. A releasable tether retention system comprising:
    a housing; and
    a retaining member positioned within the housing and including a projection extending from the housing, the retaining member being movable along an axis of the housing between a first position along the housing and a second position along the housing different from the first position, the projection being rotatable about the axis between a first orientation at the first position, and a second orientation at the second position.

19. The system of claim 18 wherein the projection retains a tether thereon when the projection is in the first orientation, and wherein the tether is no longer retained by the projection after rotation of the projection from the first orientation to the second orientation.

* * * * *

UNITED STATES PATENT AND TRADEMARK OFFICE
CERTIFICATE OF CORRECTION

PATENT NO. : 8,628,114 B1
APPLICATION NO. : 13/184118
DATED : January 14, 2014
INVENTOR(S) : Quioc Page 1 of 1

It is certified that error appears in the above-identified patent and that said Letters Patent is hereby corrected as shown below:

In the Specification

Column 7; Line 66;   Please delete the first occurrence of "the".

Column 8; Line 67;   Please delete "tether" and insert --Tether--.

Signed and Sealed this
Twenty-fifth Day of March, 2014

Michelle K. Lee
*Deputy Director of the United States Patent and Trademark Office*